United States Patent
Shiina

(10) Patent No.: US 10,578,936 B2
(45) Date of Patent: Mar. 3, 2020

(54) LIQUID CRYSTAL DISPLAY DEVICE

(71) Applicant: Japan Display Inc., Minato-ku (JP)

(72) Inventor: Hideki Shiina, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 16/051,535

(22) Filed: Aug. 1, 2018

(65) Prior Publication Data

US 2019/0064561 A1    Feb. 28, 2019

(30) Foreign Application Priority Data

Aug. 28, 2017  (JP) .................... 2017-163249

(51) Int. Cl.
G02F 1/1362 (2006.01)
G06F 3/041 (2006.01)
G02F 1/1343 (2006.01)

(52) U.S. Cl.
CPC ...... *G02F 1/136227* (2013.01); *G06F 3/0412* (2013.01); *G02F 2001/13629* (2013.01); *G02F 2001/134372* (2013.01)

(58) Field of Classification Search
CPC ... G02F 2001/134372; G02F 1/136227; G02F 2001/13629
See application file for complete search history.

(56) References Cited

U.S. PATENT DOCUMENTS

2015/0097192 A1   4/2015  Araki et al.
2016/0334680 A1  11/2016  Miyamoto
2017/0176798 A1*  6/2017  Ahn .............. G02F 1/1345

FOREIGN PATENT DOCUMENTS

JP   2015-75605    4/2015
JP   2016-218131  12/2016

* cited by examiner

*Primary Examiner* — Phu Vu
(74) *Attorney, Agent, or Firm* — Oblon, McClelland, Maier & Neustadt, L.L.P.

(57) ABSTRACT

The purpose is to realize a high definition liquid crystal display device having touch panel function. The concrete structure is: The first substrate comprising; a plurality of scanning lines and a plurality of video signal lines, a semiconductor layer, a pixel electrode, a common electrode formed in plural pixels in common, a through hole to connect the semiconductor layer and the pixel electrode, a plurality of common metal wirings, which are formed on the common electrode and formed along the video signal lines; wherein the common electrode has a slit extending in the same direction as the scanning line extends, a bridge wiring is formed over the common metal wiring interposed by an insulating film at the place where the common metal wiring and the slit cross to each other, the common metal wiring and the bridge wiring are electrically connected to the common electrode near the edges of the slit.

13 Claims, 14 Drawing Sheets

LIQUID CRYSTAL DISPLAY DEVICE

CLAIM OF PRIORITY

The present application claims priority from Japanese Patent Application JP 2017-163249 filed on Aug. 28, 2017, the content of which is hereby incorporated by reference into this application.

BACKGROUND OF THE INVENTION

(1) Field of the Invention

The present invention relates to a liquid crystal display device, specifically to a display device that includes a touch panel function.

(2) Description of the Related Art

Recently, display devices that include touch panel function for input means are increasing in the small size and the middle size liquid crystal display devices. One type of those displays is that a touch panel is formed separately from the display panel; then, the touch panel and the display panel are assembled. Another type is a so called in-cell touch panel where touch panel function is installed in the display panel.

In in-cell touch panel, the Rx electrodes (receiver electrodes) are formed outside of the counter substrate; the Tx electrodes (transfer electrodes) are formed inside of the TFT (Thin Film Transistor) substrate. The Tx electrodes are formed by dividing the common electrode. In the meantime, the common metal wirings are used to decrease the resistance of the common electrode in some devices.

The patent document 1 (Japanese patent laid open 2015-75605) and the patent document 2 (Japanese patent laid open 2016-218131) disclose how to locate the common metal wirings when the common electrode is used as the Tx electrode in the liquid crystal display device, in which an in-cell touch panel function is installed.

SUMMARY OF THE INVENTION

The liquid crystal display device has a structure that the TFT substrate and the counter substrate oppose to each other and the liquid crystal layer is sandwiched between them; wherein the TFT (Thin Film Transistor), the pixel electrode, the common electrode, the scanning lines, the video signal lines are formed on the TFT substrate.

In the in-cell touch panel, Rx electrodes (receiving electrodes) are formed outside the counter substrate to extend in e.g. the same direction that the scanning lines extend (herein in the lateral direction). In addition, the common electrode, which is formed at the liquid crystal layer side of the TFT substrate, is divided to form the Tx electrodes (transferring electrodes), which extend in orthogonal to the direction that scanning lines extend (herein in the longitudinal direction). The touch position is detected by measuring static capacitance Ct formed between the Rx electrode and the Tx electrode.

In each of the pixels, a through hole is formed to connect the pixel electrode and the source electrode of the TFT; the diameter of the through hole becomes big since the through hole is formed in the thick organic passivation film. The common electrode is formed avoiding the through hole. Therefore, the connecting wiring, which extends in the longitudinal direction in the area between the through holes, is necessary to connect the common electrodes.

The size of the pixel becomes smaller according to the definition of the screen becomes higher. On the other hand, a thickness of the organic passivation film on which the through holes are formed cannot be decreased in proportion to the size of the pixel. Consequently, a space between the through holes becomes narrower, thus, it becomes difficult to have an enough space for the connection between the common electrodes.

The purpose of the present invention is to realize the structure of connecting wirings between the common electrodes in good workability as well as with high reliability even in the case where the space between the adjacent through holes becomes narrower.

The present invention overcomes the above explained problem; the concrete structures are as follows.

(1) A liquid crystal display device comprising: a liquid crystal layer is sandwiched by a first substrate and a second substrate, the first substrate comprising; a plurality of scanning lines and a plurality of video signal lines, the video signal lines cross the scanning lines, a semiconductor layer, a pixel electrode, a common electrode formed in plural pixels in common, a through hole to electrically connect the semiconductor layer and the pixel electrode, a plurality of common metal wirings, which are formed on the common electrode and formed along the video signal lines; wherein the common electrode has a slit over the through hole, the slit extending in the same direction as the scanning line extends, a bridge wiring is formed over the common metal wiring interposed by an insulating film at the place where the common metal wiring and the slit cross to each other, the common metal wiring and the bridge wiring are electrically connected to the common electrode near the edges of the slit.

(2) The liquid crystal display device including a touch panel function comprising: a liquid crystal layer is sandwiched by a first substrate and a second substrate, the first substrate comprising; a plurality of scanning lines and a plurality of video signal lines, the video signal lines cross the scanning lines, a semiconductor layer, a pixel electrode, a common electrode, which also works as a driving electrode for the touch panel, formed in plural pixels in common, a through hole to connect the semiconductor layer and the pixel electrode, a plurality of common metal wirings, which are formed on the common electrode and formed along the video signal lines;

wherein the common electrode has a first slit over the through hole, the first slit extending in a same direction as the scanning line extends, a bridge wiring is formed over the common metal wiring interposed by an insulating film at the place where the common metal wiring and the first slit cross to each other, the common metal wiring and the bridge wiring are electrically connected to the common electrode near the edges of the first slit, the common electrode further comprises a plurality of second slits along the video signal lines, a plurality of receiving electrodes for the touch panel are formed on a surface of the counter substrate, which is an opposite side from that the second substrate contacts the liquid crystal layer.

DETAILED DESCRIPTION OF THE PREFERRED EMBODIMENTS

The present invention will be described in detail referring to the following embodiments.

Embodiment 1

Figure 1:
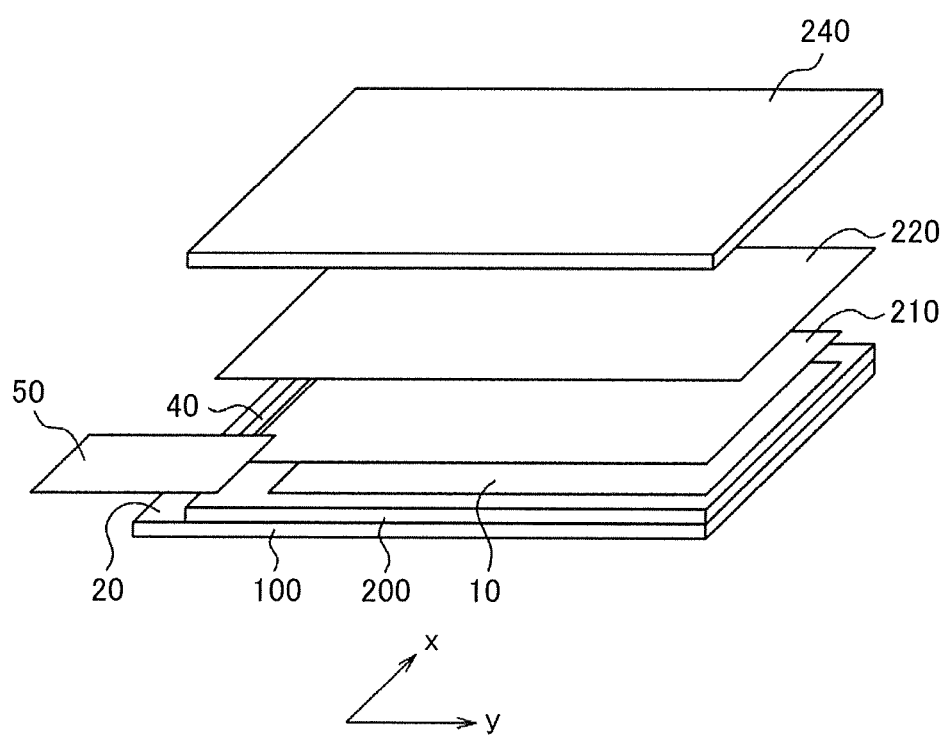
FIG. 1 is an exploded perspective view of the liquid crystal display device according to the present invention.

FIG. 1 is an example of an exploded perspective view of the liquid crystal display device according to the present invention. The liquid crystal display panel for display in FIG. 1 has also a function of touch panel. In FIG. 1, the counter substrate 200 is disposed over the TFT substrate 100; Rx electrodes (the first electrodes), which are detecting electrodes, are formed on the outside (display surface side) of the counter substrate 200. The protecting film 210 made of transparent organic substance as e.g. acrylic is formed over the first electrodes Rx. The upper polarizing plate 220 is disposed on the protecting film 210. The cover glass 240 is disposed over the polarizing plate 220. Though they are not shown in FIG. 1, the lower polarizing plated is disposed under the TFT substrate 100; in addition, a back light is set rear the lower polarizing plate.

In FIG. 1, the flexible wiring substrate 50 for the touch panel is connected to the edge of the counter substrate 200 to connect with the first electrodes formed outside of the counter substrate 200. In the meantime, the Tx electrodes (second electrodes) for driving the touch panel are formed by patterning the common electrode of the TFT substrate 100 of the liquid crystal display panel to make the liquid crystal display panel of FIG. 1 function as the touch panel. Such structure of touch panel is called in-cell type.

In FIG. 1, the display area 10 is formed at an area where the TFT substrate 100 and the counter substrate 200 overlap to each other. The TFT substrate 100 is made bigger than the counter substrate 200; the portion of the TFT substrate 100 that does not overlap with the counter substrate 200 is the terminal area 20; the driver IC 40 is installed in the terminal area 150. Though it is omitted in FIG. 1, a main flexible wiring substrate is connected to the terminal area 20 to supply signals and powers to the liquid crystal display device. In FIG. 1, the lateral direction, namely the orthogonal direction to the side along the terminal area 20, is y axis; the direction parallel to the side along the terminal area 20 is x axis.

Figure 2:
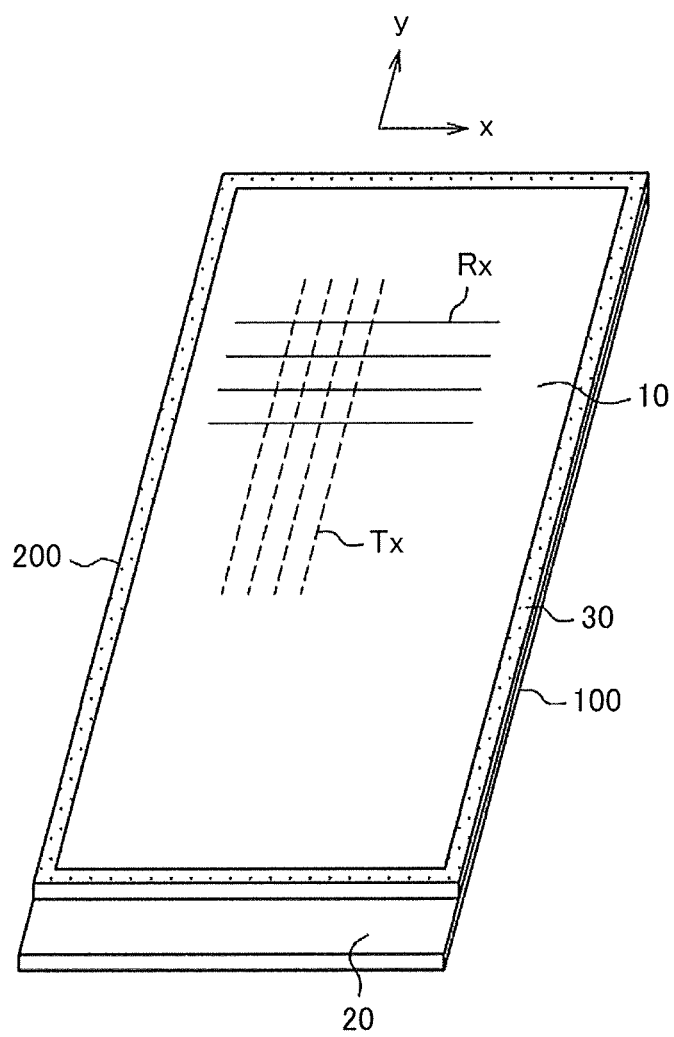
FIG. 2 is a perspective view of the liquid crystal display panel.

FIG. 2 is a perspective view of the liquid crystal display panel constituted by the TFT substrate 100 and the counter substrate 200 of the liquid crystal display device of FIG. 1. A thickness of the TFT substrate 100 is e.g. 0.15 mm and a thickness of the counter substrate 200 is e.g. 0.15 mm in FIG. 2.

In FIG. 2, the counter substrate 200 is adhered to the TFT substrate 100 through the seal material 30; the liquid crystal is sealed between them. The display area 10 is surrounded by the seal material 30. The first electrodes Rx for touch panel are formed on the outside of the counter substrate 200; the second electrodes Tx for touch panel are formed on inside of the TFT substrate 100 by patterning the common electrode. In FIG. 2, the direction parallel to the side along the terminal area is x axis; the orthogonal direction to the side along the terminal area is y axis. The axes are the same for other figures.

Figure 3:
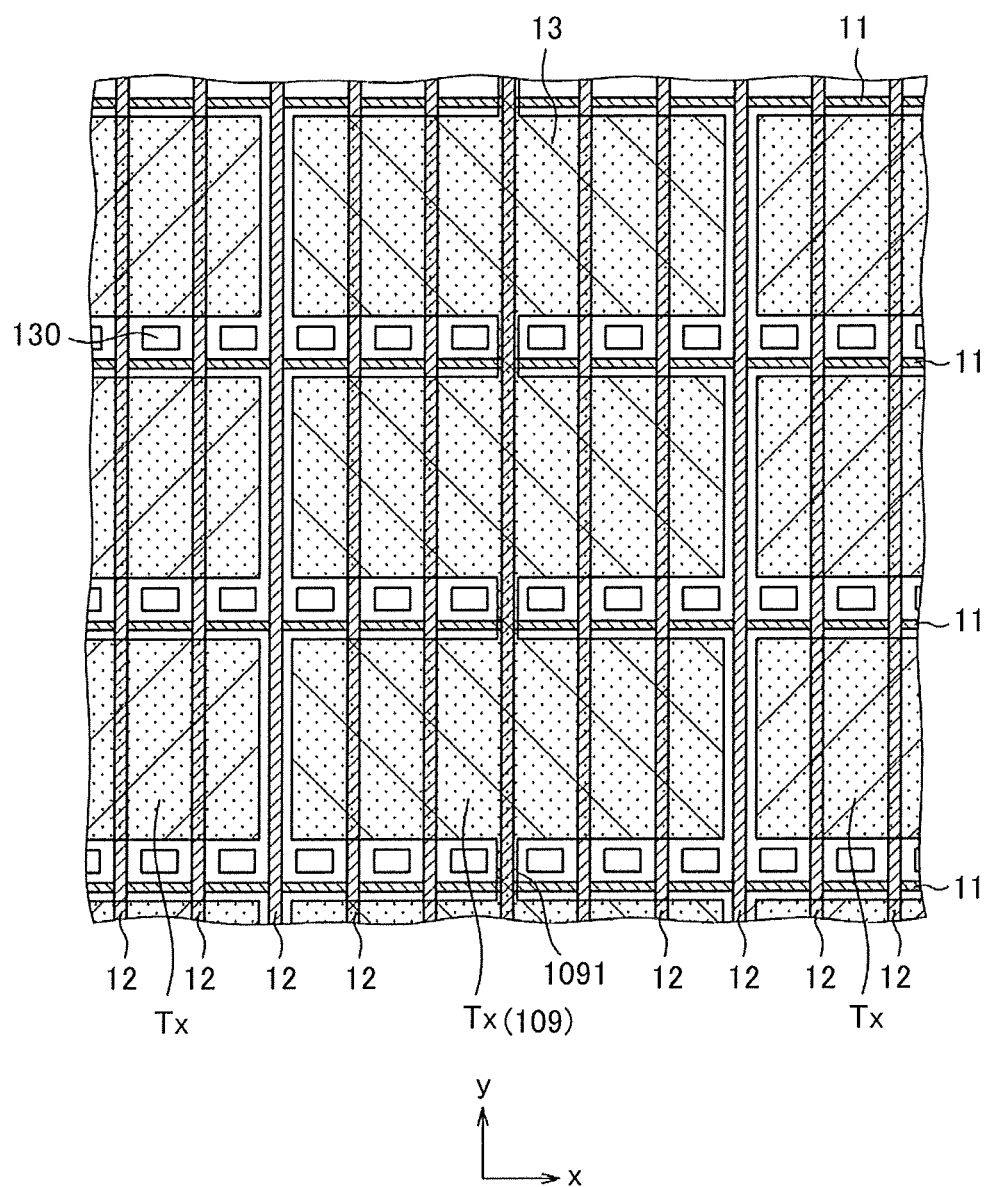
FIG. 3 is a plan view of the layout when the common electrode is used as electrodes of one side of the touch panel.

FIG. 3 is a plan view of the Tx electrodes on the TFT substrate 100. In FIG. 3, the scanning lines 11 extend in the lateral direction (x direction) and are arranged in the longitudinal direction (v direction); the video signal lines 12 extend in the longitudinal direction and are arranged in the lateral direction. The pixel 13 is formed in the area surrounded by the scanning lines 11 and the video signal lines 12.

The common electrode 109, which is formed by ITO (Indium Tin Oxide), is formed in common for plural pixels 13 in the IPS (In Plane Switching) type liquid crystal display device. However, there is an opening of the common electrode 109 at the area surrounding the through hole 130, which is formed for the connection of the pixel electrode and the source electrode of the TFT; the pixel electrode is formed on the upper layer of the common electrode 109 and the source electrode is formed on the lower layer of the common electrode 109. According to the screen becomes higher definition, the size of the pixel becomes smaller; consequently, the opening of the common electrode 109 to avoid the through holes 130 are formed continuously in the lateral direction for a plurality of the pixels 13. Therefore, the common electrode 109 becomes to have a slit extending in the lateral direction, in which through holes 130 arranged along the scanning line 11 are included. The common electrodes 109 are connected periodically in the longitudinal direction by the bridge portions 1091 formed over the video signal lines 12. Sometimes, at the bridge portion 1091 in FIG. 3, the centers of the through holes 130 at both sides of the bridge portion 1091 are deviated in the lateral direction from the centers of the pixels to make a room for the bridge wiring.

The common electrode 109 works as the Tx electrode for the touch panel, too. In this embodiment, the Tx electrode extends in y direction; consequently, the Tx electrode, which has a width of six pixels x direction, extends in y direction in FIG. 3. In other words, a non-forming portion (slit) of the common electrode 109 is formed over the video signal line 12 at every six pixels; each of the Tx electrodes are electrically insulated to each other.

Figure 4:
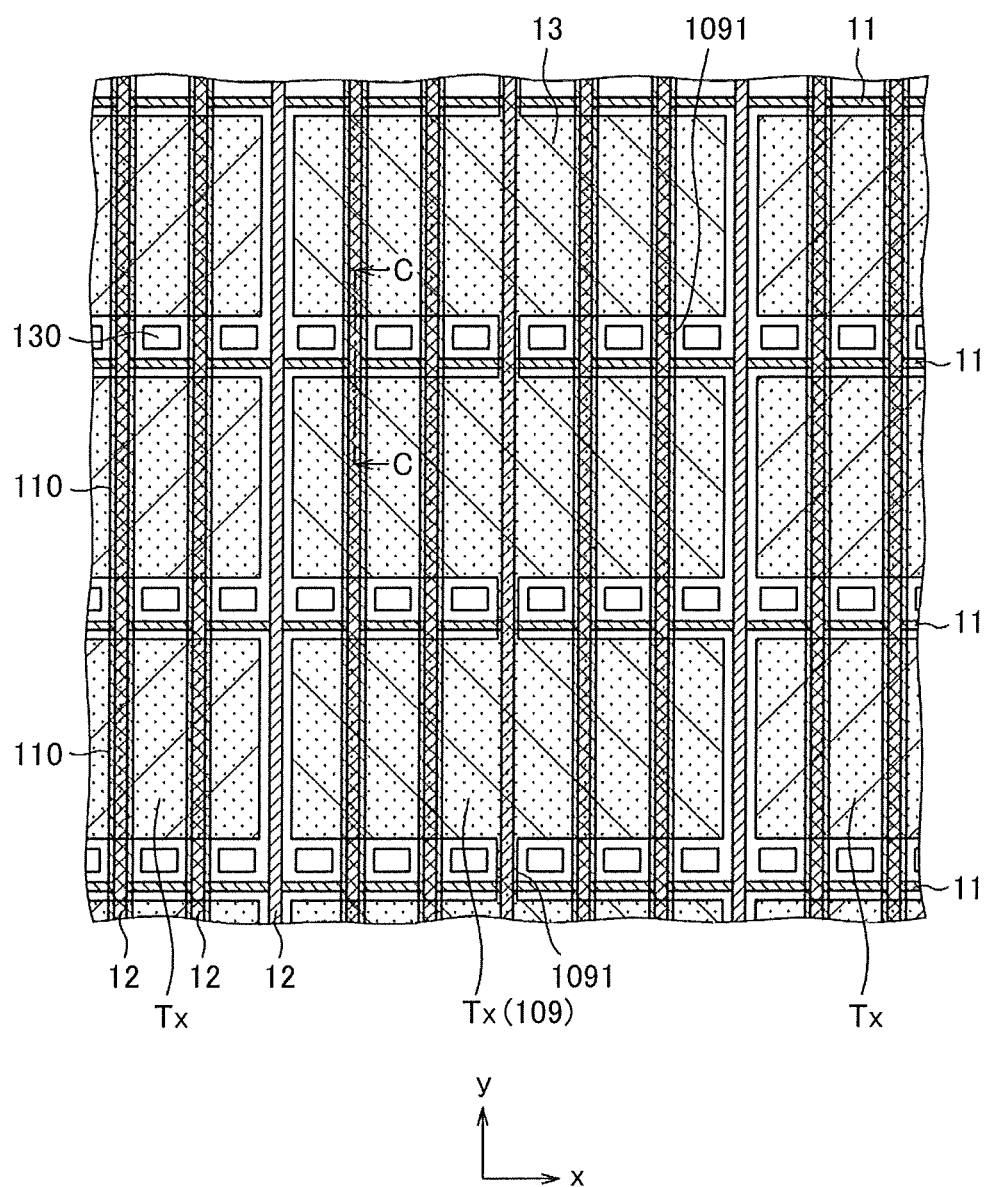
FIG. 4 is a plan view when the common metal wirings are laid out.

By the way, the common electrode 109 is formed by ITO, which has higher electrical resistance than metals. Specifically the resistance becomes higher at the bridge portion 1091, when the bridge portion 1091 is formed by ITO. Therefore, the common metal wiring 110 is laminated on the common electrode 109 to avoid increase of the electric resistance as depicted in FIG. 4. The common metal wiring 110, which is formed over the video signal line 12, extends in y direction along a plurality of pixels 13. The common metal wiring, however, is not formed over the video signal line 12 at the slit in the longitudinal direction of the common electrode 109 and over the continual video signal line 12 at the slit in the lateral direction of the common electrode.

As depicted in FIG. 4, in the present embodiment, a slit is formed along the scanning line 11 in the common electrode 109; the common metal wiring 110 is formed to go over the slit. An edge of the common electrode 109 exists at the position of the slit; naturally, a step corresponding to a thickness of the common electrode 109 is formed there.

Figure 10:
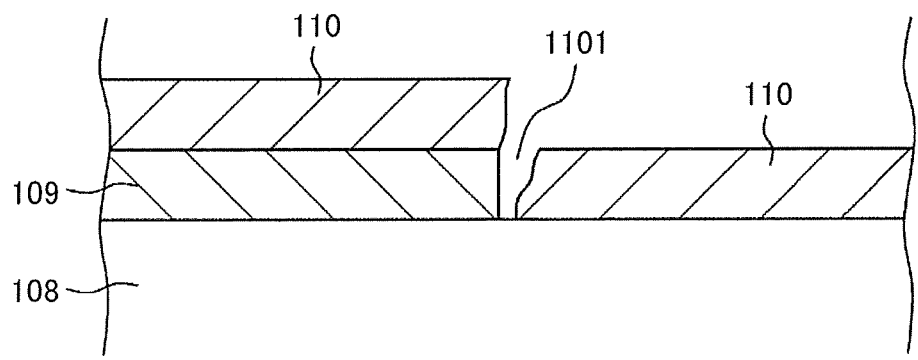
FIG. 10 is a cross sectional view of FIG. 4 along the line C-C, which shows a problem of FIG. 4.

FIG. 10 is a cross sectional view of FIG. 4 along the C-C line. In FIG. 10, a thickness of the common electrode 109 is e.g. 100 nm; a thickness of the common metal wiring 110 is e.g. 100 nm. In FIG. 10, the common metal wiring 110 is formed on the common electrode 109 formed by ITO at one place, and is formed on the organic passivation film 108 at another place. In this case, the common metal wiring 110 goes over the step formed by an edge of the common electrode 109. In the manufacturing process, the edge of the common electrode 109 does not necessarily always have a gentle slope, however, a steep edge is formed in some cases; consequently, there could be a chance that the common metal wiring 110 gets a disconnection 1101 at the steep edge as depicted in FIG. 10. Such a disconnection 1101 generally appears not only at one place but appears at many places simultaneously in one panel. When the disconnections 1101 occur, the common electrodes 109 cannot be electrically connected to each other y direction.

Figure 5:
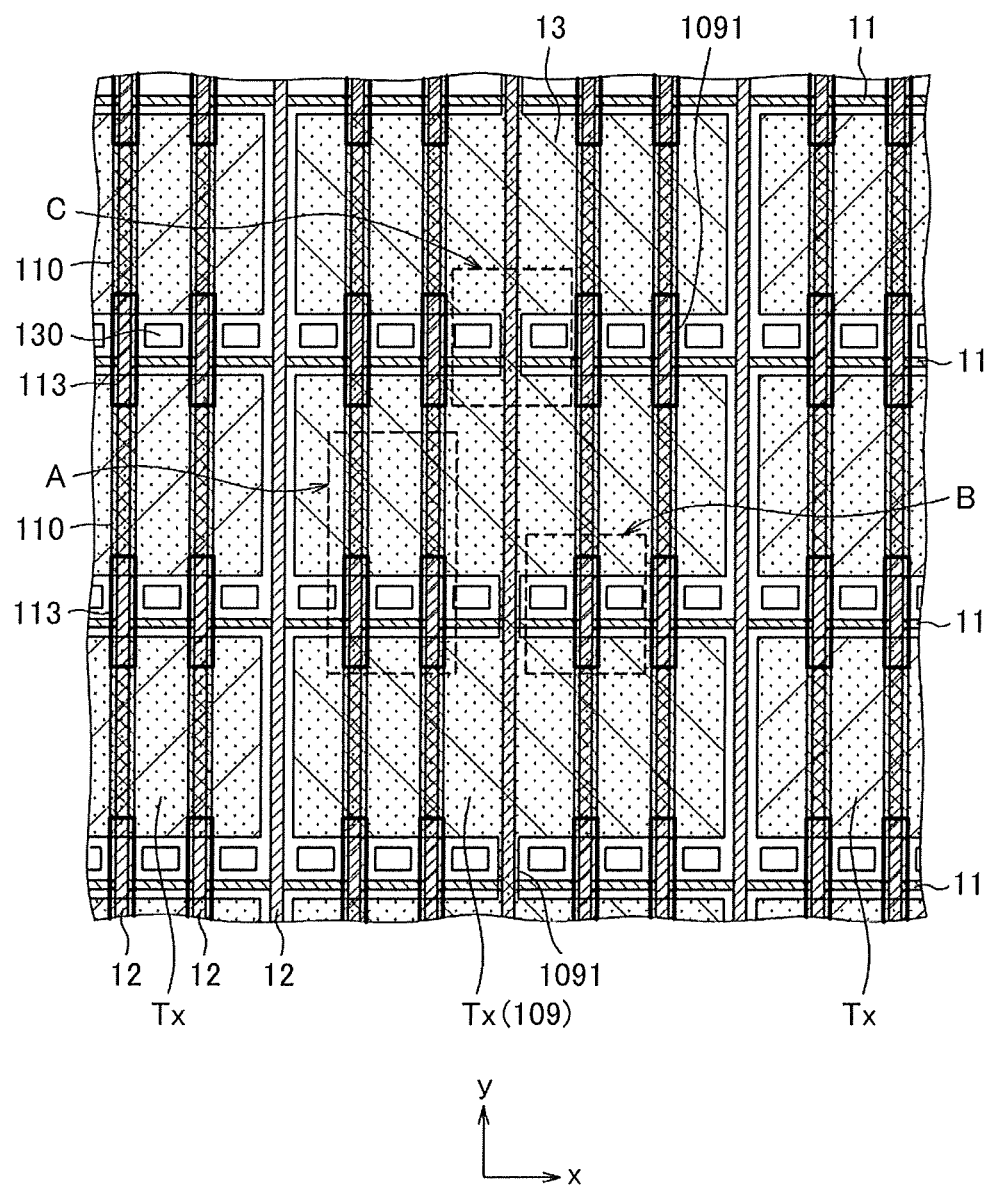
FIG. 5 is a plan view when bridge wirings are formed.

The present invention counter measures this disconnection of the common metal wirings 110; concretely the bridge wiring 113 is formed to straddle the slit, which is formed along the scanning line 11 in the common electrode 109 as depicted in FIG. 5.

Figure 6:
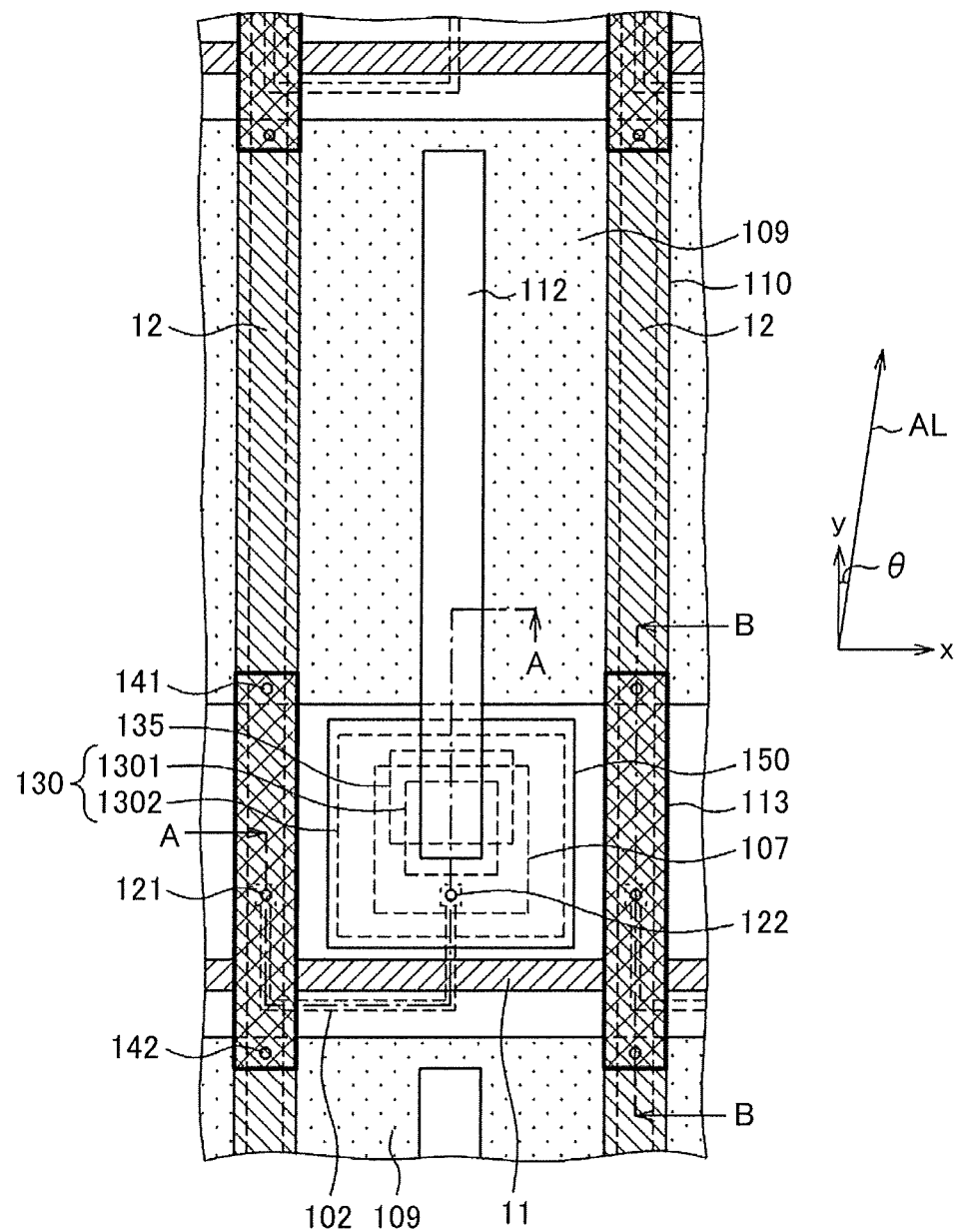
FIG. 6 is a plan view of the pixel according the present invention.
Figure 11:
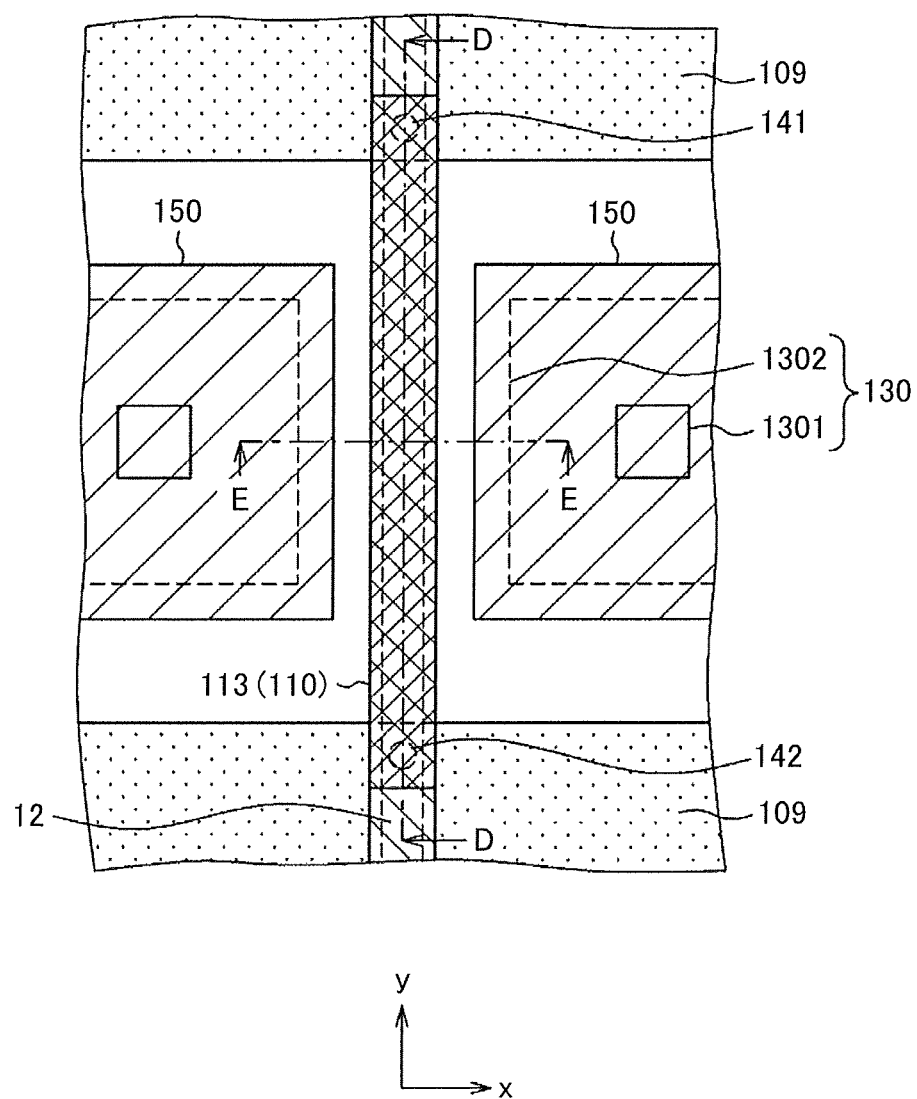
FIG. 11 is a detailed plan view of the area surrounded by the line B in FIG. 5.

FIG. 6 is a plan view of the pixel 13, which corresponds to the area surrounded by the frame line A in FIG. 5. FIG. 11 is a plan view of the bridge wiring 113 and its vicinity, which corresponds to the area surrounded by the frame line B in FIG. 5. The pixel 13 of FIG. 6 is the structure of the IPS type. In FIG. 16, the scanning lines 11 extend in the lateral direction (x direction) and are arranged in the longitudinal direction (y direction); the video signal lines 12 extend in the longitudinal direction and are arranged in the lateral direction. The pixel electrode 112 is formed in the area surrounded by the scanning lines 11 and the video signal lines 12.

In FIG. 6, the semiconductor layer 102 is formed under the video signal line 12 and the scanning line 11. The semiconductor layer 102 is formed by poly-silicon. The semiconductor layer 102 connects with the video signal line 12 via the through hole 121: the semiconductor layer 102 goes under along the video signal line 12, and goes through under the scanning line 11. The first TFT is formed at, this point. The semiconductor layer 102 bends twice, goes through under the scanning line 11 to extend to the direction to she pixel electrode 112. At this point, the second TFT is formed. In FIG. 6, the scanning line 11 works as a gate electrode, too.

The semiconductor layer 102 connects with the source electrode 107 via the through hole 122. The source electrode 107 connects with the pixel electrode 112 via e.g. the through hole 130. Therefore, two TFTs are formed between the pixel electrode 112 and the video signal line 12; this structure is also called a double gate TFT.

An electric field is formed between the pixel electrode 112 and the planar common electrode 109 through the capacitive insulating film 111, which is explained later; the electric field also penetrates in the liquid crystal layer 300 to rotate the liquid crystal molecules 301; consequently, the light from the back light is controlled in the pixel. In FIG. 6, a pitch of the pixel in the direction direction) that the scanning line 11 extends is premised as small as about 30 μm, consequently, the pixel electrode 112 is one stripe shaped; however, when a size of the pixel is lager, the pixel electrode 112 can have a plurality of stripes with a slit between the stripes.

In FIG. 6, the pixel electrode 112 extends in y direction. The alignment direction in the alignment film, which determines initial alignment direction of the liquid crystal molecules 301 is shown by the arrow AL. The arrow AL tilts by an angle of θ with y direction. The purpose of the tilting angle θ is to determine the direction of rotation of the liquid crystal when the electric field is formed. The angle of θ is generally 5 degree to 15 degree. In the meantime, when the alignment direction is to be set in y direction, the extending direction of the pixel electrode 112 tilts by an angle of θ with y direction. In this structure, the video signal line 12 also tilts by an angle of θ with y direction.

In FIG. 6, the portion of the through hole 130, which is formed in the organic passivation film, has rather complicated structure to take contact securely between the pixel electrode 112 and the TFT. The through hole 130 is formed in the organic passivation film, which is as thick as 2 μm to 4.5 μm; therefore, the diameter of the opening of the through hole at the side of the liquid crystal becomes big; and the cross section of the through hole is a reverse trapezoidal. In FIG. 6, a small size opening 1301 is at the side of the source electrode 107 and a large size opening 1302 is at the upper side in the through hole 130.

In FIG. 6, the source electrode 107 connects with the semiconductor layer 102 via the through hole 122. The source electrode 107 connects, via the through hole 1301 formed on the organic passivation film, with the contact electrode 150, which is formed to cover the through hole 130. The contact electrode 150, which is made of ITO, is formed simultaneously with the common electrode 109; however the contact electrode 150 is insulated from the common electrode 109.

The through hole 135 is formed in the capacitive insulating film 111 in the through hole 130; the contact electrode 150 and the pixel electrode 112 contact to each other in the through hole 135. In other words, the pixel electrode 112 connects with the source electrode 107 via the contact electrode 150.

Figure 7:
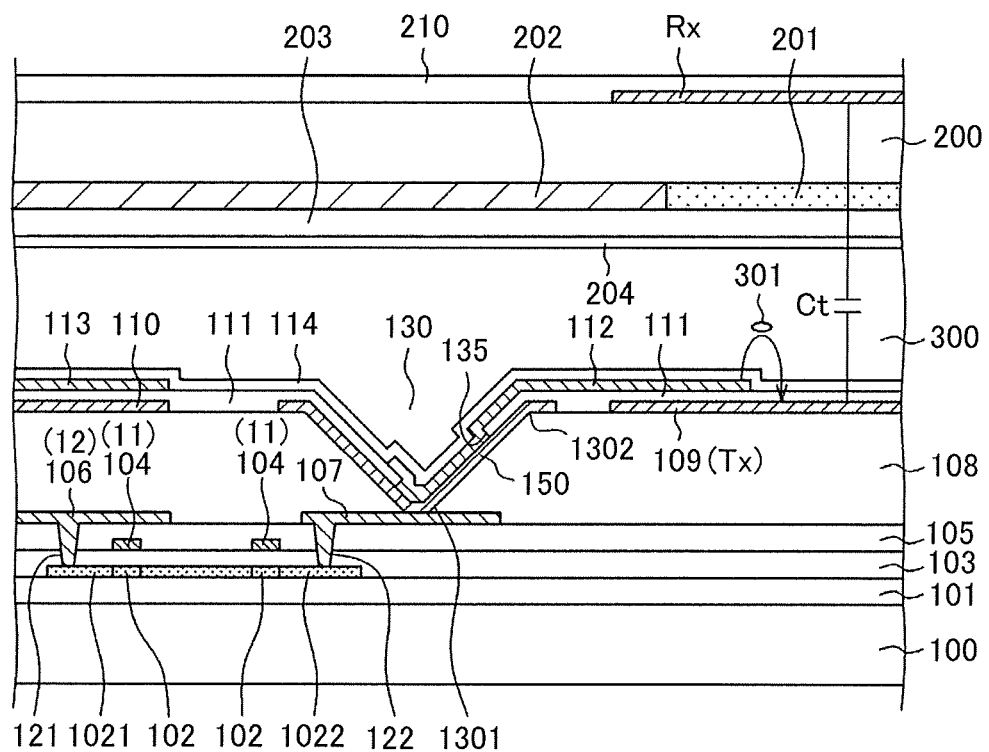
FIG. 7 is a cross sectional view of FIG. 6 along the line A-A.

In FIG. 6, the common metal wiring 110 is formed on the organic passivation film 108 overlapping with the video signal line 12 in a plan view. The common metal wiring 110 is made of metal; consequently, a gradation of the voltage in the common electrode 109 can be avoided. In FIG. 6, the upper common electrode 109 and the lower common electrode 109 are connected by the common metal wiring 110 and the bridge wiring 113 made of ITO. FIG. 7 is a cross sectional view of FIG. 6 along the line A-A. In FIG. 7, the undercoat 101 is formed on the TFT substrate 100 made of e.g. glass. A bendable liquid crystal display device can be formed either by making the thickness of the glass substrate as thin as 0.2 mm or less, or by making the TFT substrate 100 by resin, like e.g. polyimide.

The role of the undercoat 101 is to prevent the semiconductor layer 102 from being contaminated by impurities in the glass substrate or resin substrate. The undercoat 101 is generally formed by a laminated film of a silicon nitride (herein after SiN) film and a silicon oxide (herein after SiO) film. The semiconductor layer 102 is formed on the undercoat 101. The semiconductor layer 102 is formed as that: an a-Si layer is formed by CVD; the a-Si layer is transformed to the poly-silk on layer by applying the excimer laser to the a-Si layer. By the way, the SiN film and the SiO film, which constitute the undercoat layer 101, and the a-Si layer, which is to be transformed to the poly silicon semiconductor layer 102, are formed continuously by CVD.

After the semiconductor layer 102 is patterned, the gate insulating film 103 is formed covering the semiconductor layer 102. The gate insulating film 103 is a SiO film, which is formed by CVD using TEOS (Tetraethoxysilane) as the material. The gate electrode 104 is formed on the gate insulating film 103. The gate electrode 104 is formed by e.g. MoW (Molybdenum Tungsten) alloy film; the MoW alloy film is formed by sputtering, subsequently is patterned by photolithography. In the structure of FIG. 6, the scanning line 11 works as the gate electrode 104; two TFTs are formed when the semiconductor layer 102 goes through under the scanning line 11 twice. Thus, in FIG. 7, two gate electrodes 104 are formed. By the way, if the electrical resistance of the scanning line 11 is required to be low, the structure that an Aluminum (Al) layer is sandwiched by Titan (Ti) layers is used for the scanning line 11.

After the gate electrode 104 is patterned, Phosphor (P) or Boron (B), etc. are doped by ion implantation to give conductivity to the semiconductor layer 102 except the region that is covered by the gate electrode 104. Thus, the drain region 1021 and the source region 1022 are formed in the semiconductor layer 102.

After that, the interlayer insulating film 105 covering the gate electrode 104 is formed by a SiO film or a SiN film, or formed by a laminated film of a SiO film and a SiN film. The interlayer insulating film 105 can be formed by CVD. The through hole 121 is formed in the interlayer insulating film 105 and the gate insulating film 103 to connect the drain region 1021 of the semiconductor layer 102 and the video signal line 12. In this case the video signal line 12 works as the drain electrode 106.

On the other hand, the source region 1022 of the semiconductor layer 102 connects with the source electrode 107 via through hole 122 formed in the interlayer insulating film 105 and the gate insulating film 103. The source electrode 107 extends on the interlayer insulating film 105 and connects with the pixel electrode 112 at the through hole 130.

The video signal line 12 and the source electrode 107 are formed simultaneously by the same material. The structure of the video signal line 12 is e.g. the Aluminum (Al) layer is sandwiched by the base metal of Titan (Ti) and the cap metal of Titan (Ti). A thickness t1 of the base metal is e.g. 10 nm; a thickness t2 of the Al is e.g. 80 nm; a thickness t3 of the cap metal is e.g. 10 nm. By the way, in this structure, the Al is generally an alloy whose main substance is aluminum. MoW etc. can be used instead of Ti. Al, MoW, Ti, etc. are formed by sputtering.

The organic passivation film 108 is formed covering the video signal lines 12 and the source electrodes 107. Since the organic passivation film 108 has a role of a flattening film, a thickness of the organic passivation film 108 is as thick as 2 μm to 4.5 μm. The through hole 130 is formed in the organic passivation film 108 to connect the source electrode 107 and the pixel electrode 112.

In FIG. 7, the contact electrode 150 made of ITO is formed to cover the through hole 130. While the contact electrode 150 is formed simultaneously with the common electrode 109, it is insulated from the common electrode 109. The contact electrode 150 connects with the source electrode 107 at the bottom hole 1301 of the through hole 130. The capacitive insulating film 111, which insulates between the common electrode 109 and the pixel electrode 112, extends in the through hole 130; the pixel electrode 112 connects with the contact electrode 150 at a large opening 135 in the capacitive insulating film 111 in the through hole 130. The pixel electrode 112 connects with the source electrode 107 via the contact electrode 150 through a relatively large opening 135 in the capacitive insulating film 111; thus, connection can be taken securely.

The common electrode 109 is formed in plane on the organic passivation film 108 at the right of the outside of the through hole 130. The common electrode 109 is removed at the through hole 130. In FIG. 7, the common electrode 109 is removed at the left of the outside of the through hole 130. After that the capacitive insulating film 111 is formed by SiN. The capacitive insulating film 111 is so called because it makes a storage capacitance between the pixel electrode 112 and the common electrode 109. The common electrode 109 is formed by ITO, which has larger electrical resistance compared with metal; therefore, the voltage drop becomes a problem. In countermeasure to this problem, the common metal wiring 110 is formed in contact with the common electrode 109. By the way, the left hand side from the through hole 130 is an area of the slit, which is formed along the scanning line 11, of the common electrode 109; therefore, the common electrode 109 made of ITO does not exist at the place overlapping the video signal line 12 in a plan view; however, the common metal wiring 110 and the bridge wiring 113 made of ITO formed simultaneously with the pixel electrode 112 are formed.

The alignment film 114, which is for an initial alignment of the liquid crystal molecules 301, is formed covering the pixel electrode 112 and the capacitive insulating film 111. When the signal voltage is applied to the pixel electrode 112 formed on the capacitive insulating film 111, the line of force depicted in FIG. 7 is generated, which rotates the liquid crystal molecules 301 to control a transparency of light from the backlight in each of the pixels; consequently, pictures are formed.

In FIG. 7, the counter substrate 200 is disposed sandwiching the liquid crystal layer 300 with the TFT substrate 100. The black matrix 202 and the color filter 201 are formed on the inside of the counter substrate 200, namely at the liquid crystal layer side of the counter substrate 200. The overcoat film 203 is formed covering the black matrix 202 and the color filter 201. The overcoat film 203 prevents the liquid crystal layer 300 from, being contaminated by pigments of the color filter 201. The alignment film 204 is formed on the overcoat film 203 for an initial alignment of the liquid crystal molecules 301.

In FIG. 7, the Rx electrode for the touch panel is formed on the outside of the counter substrate 200, namely on the viewer side of the counter substrate; the protective layer 210 is formed over the Rx electrode. The capacitance Ct is formed between the Rx electrode and the Tx electrode, which is formed by the common electrode 109. When a person touches the surface of the counter substrate 200, the value of the capacitance Ct changes; thus, the touch position is detected.

Figure 8:
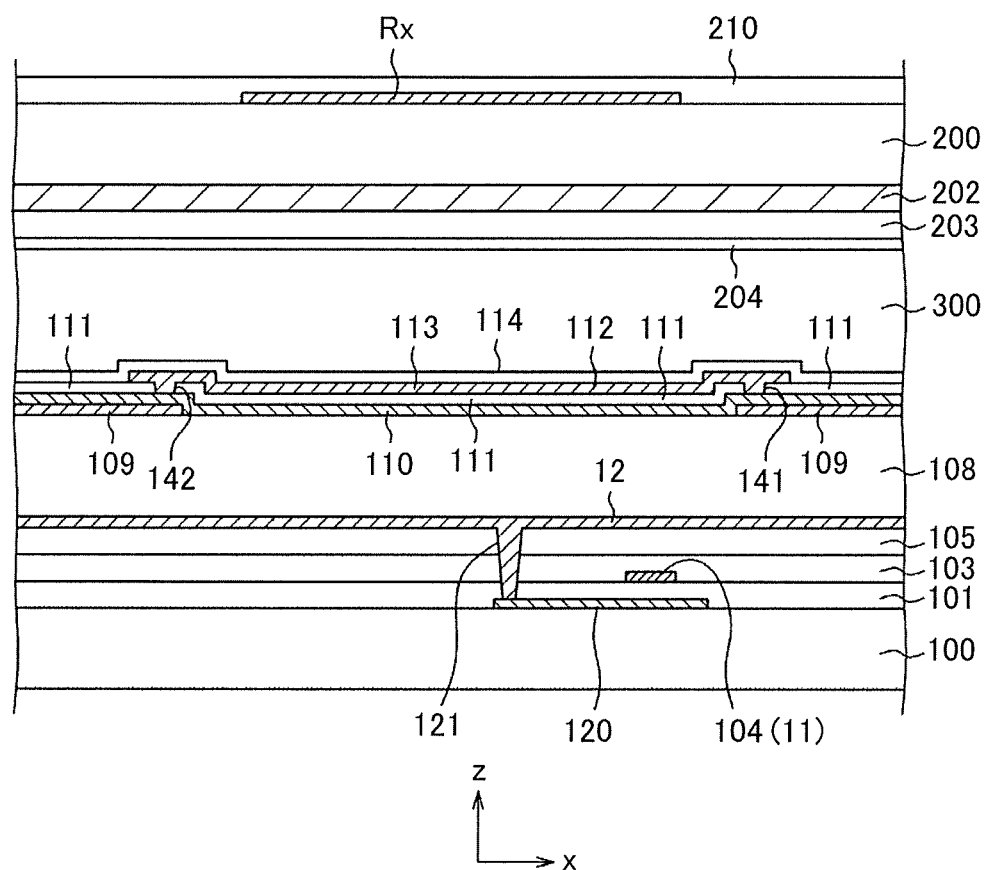
FIG. 8 is a cross sectional view of FIG. 6 along the line B-B.

FIG. 8 is a cross sectional view of FIG. 6 along the line B-B. In FIG. 8, the undercoat 101, the gate insulating film 103, the interlayer insulating film 105 are formed on the TFT substrate 100, and the video signal line 12 is formed on the interlayer insulating film 105. The organic passivation film 108 is formed covering the video signal line 12; the common electrode 109 is formed on the organic passivation film 108. As depicted in FIG. 6, the common electrode 109 is separated into the upper side and the lower side in the y direction; the interval between the upper portion and the lower portion of the common electrode 109 are bridged by the common metal wiring 110 at the B-B cross section in FIG. 6.

If there is no problem in the common metal wiring 110, the common electrode 109 in the upper side and the common electrode 109 in the lower side are connected by the common metal wiring 110; however, there is a chance of disconnection of the common metal wiring 110 because of the step at the edge of the common electrode 109. To countermeasure this problem, the present invention uses the bridge wiring 113 to connect the upper side (in y direction) of the common electrode 109 and the lower side (in y direction) of the common electrode 109; the bridge wiring 113 is formed on the capacitive insulating film 111, which covers the common electrode 109 and the common metal wiring 110; the bridge wiring 113 is formed by ITO and is formed simultaneously with the pixel electrode 112. In concrete, the bridge wiring 113 and the common metal wiring 110 are connected via through holes 141 and 142 formed in the capacitive insulating film 111. Thus, a disconnection between the common electrode 109 in the upper side pixel and the common electrode 109 in the lower pixel can be avoided. The alignment film 114 is formed covering the bridge wiring 113 and the capacitive insulating film 111.

In FIG. 8, the counter substrate 200 is formed sandwiching the liquid crystal layer 300 with the TFT substrate 100 as described in FIG. 7. FIG. 8 corresponds to the cross section along the B-B line of FIG. 6; therefore, only black matrix 202 exists on the counter substrate 200. The other structures of the counter substrate 200 are the same as explained in FIG. 7. FIG. 8 shows that the two common electrodes 109 are connected by the structure of the present invention.

As described above, in the present embodiment, since the capacitive insulating film is formed on the common metal wiring 110, the bridge wiring 113 is connected to the common metal wiring 110 via the through holes 141 and 142 formed in the capacitive insulating film 111. Thanks to the above structure, the connection between the common electrodes 109 can be made by the bridge wiring 113 formed by ITO even when the disconnection occurs in the common metal wiring 110.

The through holes 141 and 142 in the capacitive insulating film 111 are formed simultaneously with other through holes, e.g. as an opening 135 in the capacitive insulating film 111 in the through hole 130; therefore, the process load does not increase. Further, the bridge wiring 113 is formed simultaneously with the pixel electrode 112, therefore, the process load does not increase.

Figure 12:
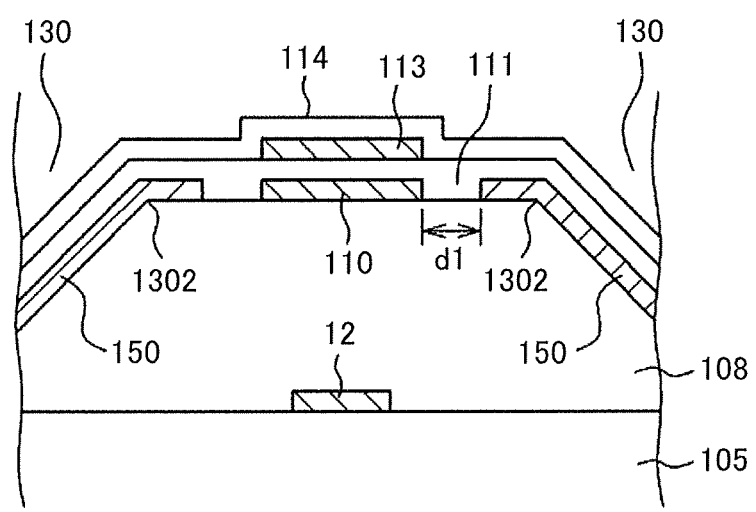
FIG. 12 is a cross sectional view of FIG. 11 along the line E-E.

FIG. 12 is a cross sectional view of FIG. 11 along the line E-E. By the way, the cross sectional view of FIG. 12 along the line D-D is the same as FIG. 8. In FIG. 12, the video signal line 12 is formed on the interlayer insulating film 105; the organic passivation film 108 is formed covering the video signal line 12. The through holes 130 are formed in the organic passivation film 108; the upper portions 1302 of the through holes 130 are depicted in FIG. 12. Generally, upper portion 1302 of the through hole is not a clear boundary; however, the boundary 1302 is drawn in FIG. 12 for explanation purpose.

The contact electrode 150 is formed covering the through hole 130. The contact electrode 150 covers up to periphery of the through hole 130. The common metal wiring 110 is formed between the through holes 130. The distance between the contact electrode 150 and the common metal wiring 110 is d1. Even the distance d1 may be as small as 2.5 μm, the problem of patterning of the photo-resist is not incurred because the contact electrode 150 and the common metal wiring 110 are formed in the different photolithography processes.

In FIG. 12, the capacitive insulating film 111 is formed covering the contact electrode 150 and the common metal wiring 110. The bridge wiring 113 made of ITO is formed on the capacitive insulating film 111 overlapping the common metal wiring 110. The bridge wiring 113 connects with the common metal wiring 110 via through hole 141 and 142 as depicted in FIG. 11. Therefore, in FIG. 11, the upper side (in y direction) of the common electrode 109 and the lower side (in y direction) of the common electrode 109 are securely connected. The alignment film 114 is formed covering the bridge wiring 113 and the capacitive insulating film 111.

Figure 13:
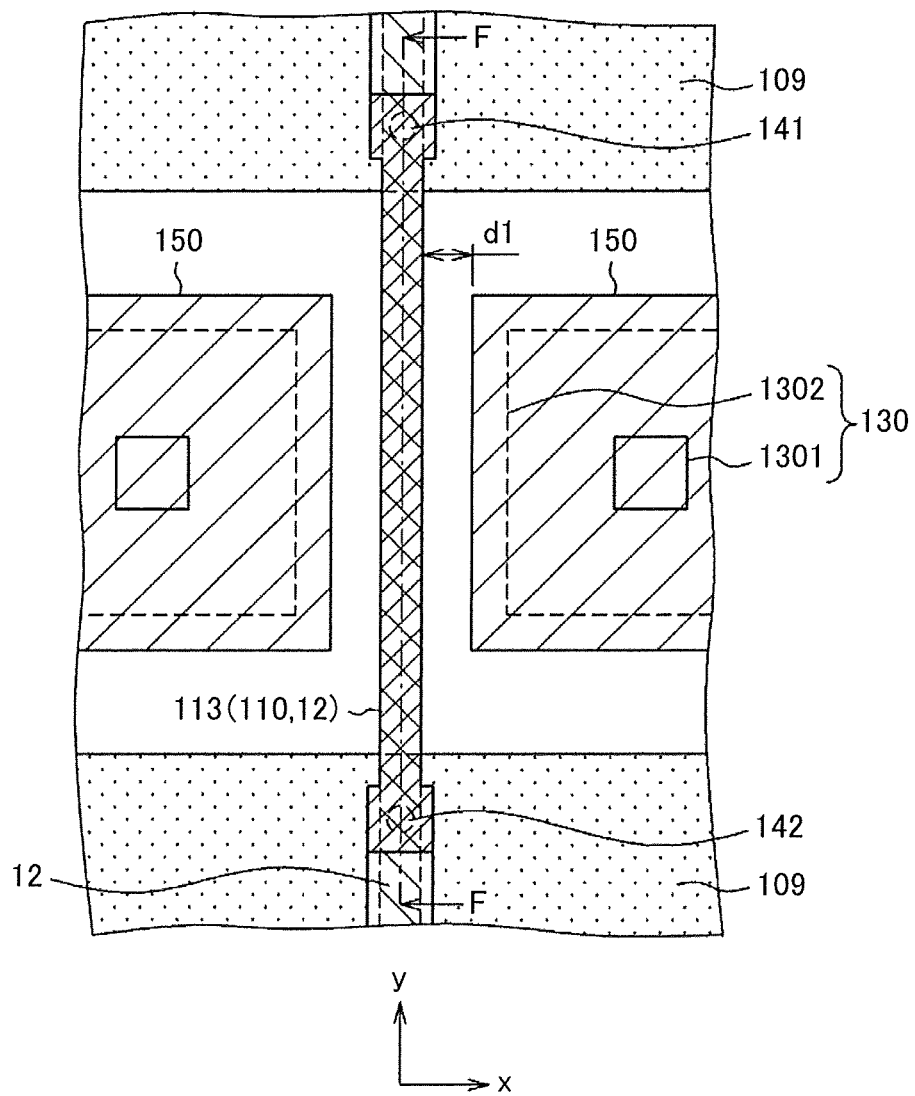
FIG. 13 is a plan view of a second example of the embodiment 1.

FIG. 13 is an enlarged plan view that shows a variation of the bridge wiring 113. FIG. 13 differs from FIG. 11 in that widths of the common metal wiring 110 and the bridge wiring 113 are narrowed at the bridge portion. According to the size of the pixel becomes further smaller, the distance d1 between the common metal wiring 110 and the contact electrode 150 also becomes further smaller.

The patterning of the photo resist is not a problem in the present invention even the distance d1 is small; however, the problem of mash alignment occurs when the distance d1 becomes smaller. In addition, certain value of d1 is necessary to maintain electrical insulation between the contact electrode 150 and the common metal wiring 110. Consequently, in FIG. 13, the width of the common metal wiring 110 and the width of the bridge wiring 113 are made as narrow as e.g. the same width of the video signal line 12. Therefore, this structure is adaptable to higher definition screen.

According the width of the common metal wiring 110 becomes narrower, there occurs more chance of disconnection; however, the connection between the common electrodes 109 is maintained by the bridge wiring 113 even the disconnection of the common metal wiring 110 occurs. The cross sectional view of FIG. 13 along the line F-F is the same as FIG. 8.

In the meantime, since the contact electrode 150 and the bridge wiring 113 are formed on different layers to each other as depicted in FIG. 12, the width of the bridge wiring 113 can be made wider than the width of the common metal wiring 110. Namely, since the bridge wiring 113 and the contact electrode 150 are insulated by the capacitive insulating film 111, the short between the bridge wiring 113 and the contact electrode 150 does not occur. Thus, the present invention is applicable to the pixel structure for higher definition.

In FIG. 11 and FIG. 13, the common metal wiring 110 and the bridge wiring 113 are connected via through holes 141 and 142; the through holes can be made groove like on the common metal wiring 110. The bridge wiring 113 is formed covering the groove like through holes.

In FIG. 6 and other figures, the center of the contact electrode 150 is on the center between the two video signal lines 12; however, there is a chance that the center of the contact electrode 150 deviates from the center between the two video signal lines 12 because of necessity of lay out. In such a case, the distance between the contact electrode 150 and the common metal wiring 110 becomes smaller at one side; the present invention has further advantage in such a structure.

Figure 9:
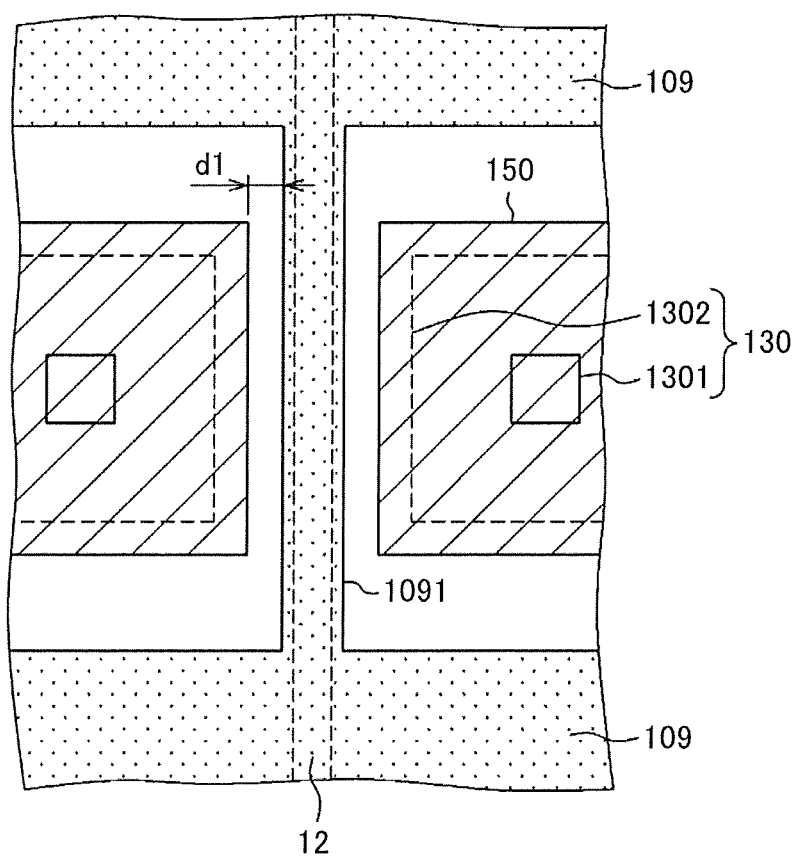
FIG. 9 is a detailed plan view of the area surrounded by the line C in FIG. 5.

FIG. 9 is a plan view corresponds to the area surrounded by the frame line C in FIG. 5. The video signal line 12 exists at the boundary between the left hand side pixel and the right hand side pixel. The through hole 130 is formed in the pixel; the contact electrode 150, which is formed by ITO and is formed simultaneously with the common electrode 109, is formed to cover the through hole 130. The contact electrode 150 is formed simultaneously with the common electrode 109, however, the contact electrode 150 is insulated from the common electrode 109. The contact electrode 150 is in the same voltage as the pixel electrode 112.

FIG. 9 shows the common electrode 109 of the upper side (in y direction) from the through hole 130 and the common electrode 109 of the lower side (in y direction) from the through hole 130 are connected by the bridge portion 1091. Naturally, since the bridge portion 1091 is formed on the same layer as the common electrode 109, the disconnection does not occur unlike the case of common metal wiring 110. In the present embodiment, the bridge portions 1091 also are formed at several positions, the reliability in the connection between the common electrodes 109 in y direction is further improved.

Embodiment 2

Figure 14:
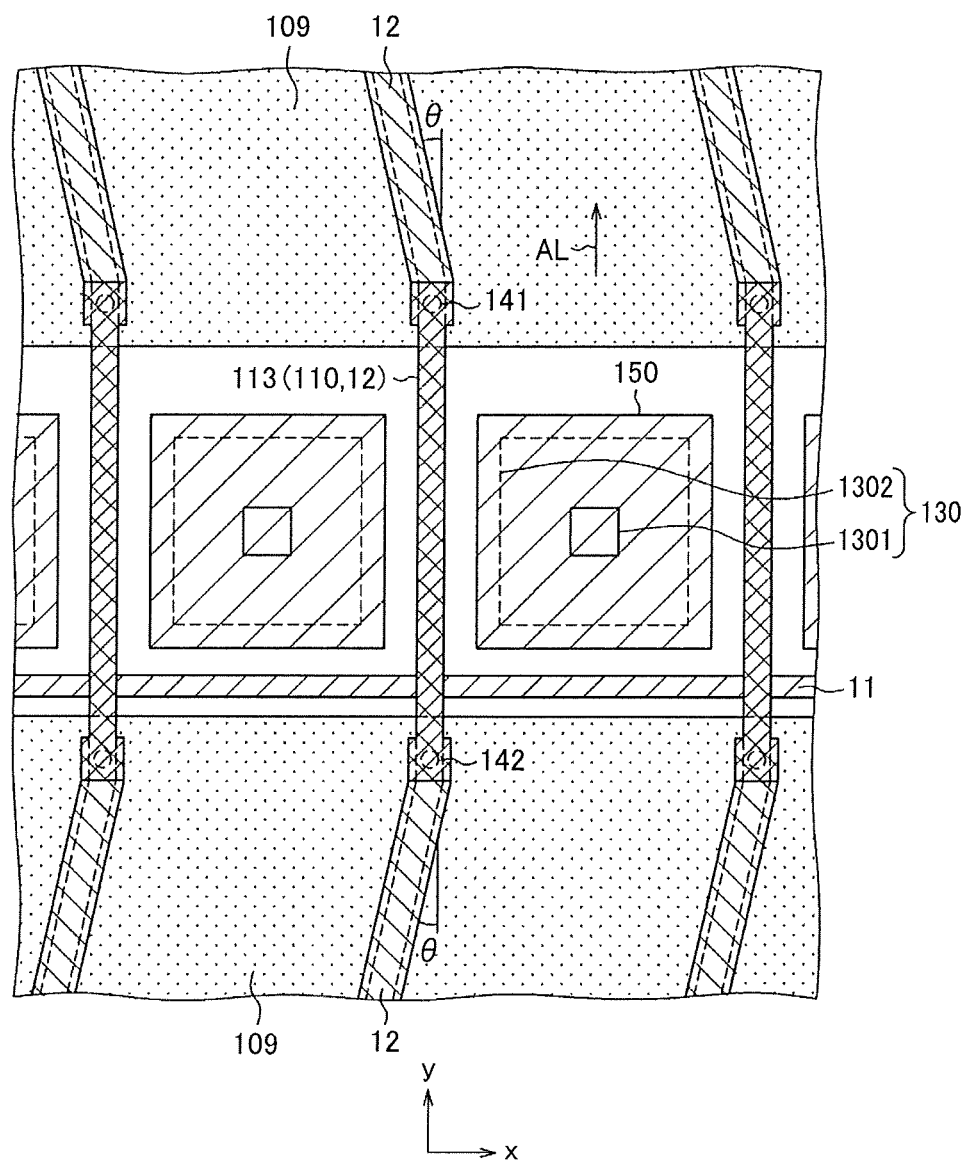
FIG. 14 is a plan view of the embodiment 2.

FIG. 14 is a plan view of that the present invention is applied to another pixel structure. FIG. 14 is a plan view of the through holes 130 and their vicinity. In FIG. 14, the elements that are not necessary for the explanation of the present invention are omitted. In FIG. 14, the pixel at upper side in y direction from the scanning line 11 is called the first pixel; the pixel at lower side in y direction from the scanning line 11 is called the second pixel. FIG. 14 differs from FIG. 3 or FIG. 6 of the embodiment 1 in that the video signal lines 12 in the first pixel tilt from the y axis in a value of θ degree while the video signal lines 12 in the second pixel tilt from the y axis in a value of θ degree.

In FIG. 14, the alignment direction AL of the alignment film is in y axis direction. In such a structure, the rotating directions of the liquid crystal molecules 301 are in reverse directions when the voltage is applied to the pixel electrode 112. Therefore, the viewing angle characteristics in azimuth can be improved. Such a structure is called a pseudo multi domain structure.

The structure of the present invention explained in the embodiment 1 can be applied to the structure of FIG. 14. In FIG. 14, the common electrode 109 in the first pixel located at upper side and the common electrode 109 in the second pixel located at lower side are electrically connected by the common metal wiring 110 and the bridge wiring 113. The structure of the bridge portion in FIG. 14 is the same as the structure of FIG. 13 of the embodiment 1; however, the structure of FIG. 11 of the embodiment 1 is also applicable. As described above, the present invention can be applied to the structure whatever the tilting angle of the video signal line 12 or the lay out of the pixel structure.

In the embodiment 1 and the embodiment 2, the pixel electrode 112 is formed on the upper layer than the common electrode 109 as depicted in FIG. 6 and FIG. 7. On the contrary, another type of IPS liquid crystal display device has a structure that the common electrode 109 with a slit for field generation is formed above the pixel electrode 112. Even such a structure, the common electrode 109 can be used as another electrode in touch panel; therefore, the present invention can be applied to such a structure.

In addition, the embodiment 1 and the embodiment 2 are explained for the structure that the touch panel is formed between the outside, namely opposite side from the liquid crystal layer, of the counter substrate 200 and the TFT substrate 100. The present invention, however, is applicable to the regular liquid crystal display device, which does not have a touch panel function. The reason is that: even in a regular liquid crystal display device, according to the pitch of the pixels becomes finer, in relation with the contact electrode 150 formed in the through hole 130, the connection between the common electrode 109 in the pixels in the upper row in y direction, and the common electrode 109 in the pixels in the lower row in y direction raises the same problem as explained in the embodiment 1 and the embodiment 2.

What is claimed is:

1. A liquid crystal display device comprising:
a liquid crystal layer is sandwiched by a first substrate and a second substrate,
the first substrate comprising; a plurality of scanning lines and a plurality of video signal lines, the video signal lines cross the scanning lines, a semiconductor layer, a pixel electrode, a common electrode formed in plural pixels in common, a through hole to electrically connect the semiconductor layer and the pixel electrode, a plurality of common metal wirings, which are formed on the common electrode and formed along the video signal lines,
wherein the common electrode has a slit over the through hole, the slit extending in a same direction as a scanning line of the plurality of scanning lines extends,
a bridge wiring is formed over a common metal wiring of the plurality of common metal wirings interposed by an insulating film at a place where the common metal wiring and the slit cross to each other,
the common metal wiring and the bridge wiring are electrically connected to the common electrode near edges of the slit.

2. The liquid crystal display device according to claim 1, wherein the bridge wiring is formed by a transparent conductive film.

3. The liquid crystal display device according to claim 1, wherein the bridge wiring is formed on a same layer as the pixel electrode.

4. The liquid crystal display device according to claim 1, wherein the common metal wiring and the bridge wiring are formed overlapping with the video signal line, wherein a width of the common metal wiring is wider than a width of a video signal line of the plurality of video signal lines.

5. The liquid crystal display device according to claim 1, wherein the common metal wiring and the bridge wiring are formed overlapping with the video signal line, wherein a width of the common metal wiring is same as a width of the video signal line.

6. The liquid crystal display device according to claim 1, wherein a width of the common metal wiring in the slit is narrower than a width of the common metal wiring on the common electrode in a plan view.

7. The liquid crystal display device according to claim 1, wherein the video signal line extends in a first angle θ to a direction orthogonal to a direction that the scanning line extends at one area in one side from the slit, the video signal line extends in an angle −θ, which is reverse direction from the first angle θ to a direction orthogonal to a direction that the scanning line extends at another area in another side from the slit.

8. The liquid crystal display device according to claim 1, wherein a distance between the common electrode and the first substrate is smaller compared with a distance between the pixel electrode and the first substrate.

9. A liquid crystal display device including a touch panel function comprising:
- a liquid crystal layer is sandwiched by a first substrate and a second substrate,
- the first substrate comprising; a plurality of scanning lines and a plurality of video signal lines, the video signal lines cross the scanning lines, a semiconductor layer, a pixel electrode, a common electrode, which also works as a transferring electrode for a touch panel, formed in plural pixels in common, a through hole to connect the semiconductor layer and the pixel electrode, a plurality of common metal wirings, which are formed on the common electrode and formed along the video signal lines,
- wherein the common electrode has a first slit over the through hole, the first slit extending in a same direction as a scanning line of the plurality of scanning lines extends,
- a bridge wiring is formed over the common metal wiring interposed by an insulating film at a place where a common metal wiring of the plurality of common metal wirings and the first slit cross to each other,
- the common metal wiring and the bridge wiring are electrically connected to the common electrode near edges of the first slit,
- the common electrode further comprises a plurality of second slits along the video signal lines,
- a plurality of receiving electrodes for the touch panel are formed on a surface of a counter substrate, which is an opposite side from that the second substrate contacts the liquid crystal layer.

10. The liquid crystal display device according to claim 9, wherein the receiving electrodes extend in a direction as the scanning lines extend and are arranged in orthogonal to the direction the scanning lines extend.

11. The liquid crystal display device according to claim 9, wherein a distance between the second slits is a width of the transferring electrode of the touch panel.

12. The liquid crystal display device according to claim 9, wherein the bridge wiring is made of a transparent conductive film.

13. The liquid crystal display device according to claim 9, wherein the bridge wiring is formed on a same layer as the pixel electrode is formed.

* * * * *